United States Patent Office 3,029,183
Patented Apr. 10, 1962

3,029,183
GERMICIDAL IODINE COMPOSITIONS
Murray W. Winicov, Flushing, and Melville G. Sutton, Kew Gardens, N.Y., assignors to West Laboratories, Inc., Long Island City, N.Y., a corporation of New York
No Drawing. Filed May 18, 1959, Ser. No. 813,691
9 Claims. (Cl. 167—17)

This invention relates to nonionic carrier-iodine compositions having useful germicidal and surface active properties. More particularly, the invention relates to the utilization of certain normally insoluble alkyl phenol ethylene oxide condensates either as the only iodine carrier, or in conjunction with certain other nonionic surface active carriers in carrier-iodine formulations wherein it is desired to have in use dilutions, enhanced surface tension depressant action and high spreading co-efficient. Expressed in more practical terms, these properties result in low foaming and good draining when use dilutions of the formulations are used for germicidal rinses, and the like. Such low foaming and good draining properties are of special advantage in germicidal treatment of all food handling equipment, and particularly in pipe lines and equipment characteristic of the dairy industry, and the like.

The use of nonionic carrier-iodine preparations in environmental sanitation has been increasing rapidly in recent years with primary commercial products containing as iodine carriers, water-soluble alkyl phenol ethylene oxide condensates and condensates of ethylene oxide with preformed polypropylene glycols distributed by Wyandotte Chemicals Corporation under the trademark "Pluronics."

The present invention, however, is concerned with a distinct departure from prior teachings, having special advantages in various types of environmental sanitation products, wherein an alkyl phenol ethylene oxide condensate, which by itself is a water insoluble material, is utilized as the sole iodine carrier in water-soluble carrier-iodine formulations, or alternatively, is employed in conjunction with certain of the Pluronics.

The alkyl phenol-ethylene oxide condensates embraced by this invention are those wherein the phenol group contains at least one alkyl substituent with a total of 8 to 20 carbon atoms in such alkyl substituents, and wherein the amount of ethylene oxide is somewhat less than the amount required to impart water solubility to the condensate. More specifically, the condensate should contain an amount of ethylene oxide such that the ratio of carbon atoms in the alkyl phenol to mols of ethylene oxide is in the range of about 2.1 to 1–3 to 1. Thus for example, a nonyl phenol ethylene oxide condensate should contain 5 to 7 mols of ethylene oxide per mol of nonyl phenol and preferably about 6 mols of ethylene oxide.

Whereas alkyl phenol ethylene oxide condensates, containing limited amounts of ethylene oxide as above noted are themselves water-insoluble materials, it has been found that when these ethylene oxide condensates are combined in the proportions of about 3:1 to 6:1 with elemental iodine to form anhydrous solutions of iodine in the condenstes, the resulting carrier iodine complex becomes water-soluble and can be dissolved in water to an appreciable extent. Furthermore, such solutions can be diluted to provide a 100 p.p.m. iodine solution (practical for many environmental sanitation purposes) while remaining entirely clear. In contrast to this, an attempt to dissolve an equivalent amount of the alkyl phenol-ethylene oxide condensate alone in water, results in a milky mixture, indicative of the insolubility of the condensate alone. This solubilizing effect of iodine upon the alkyl phenol ethylene oxide condensate is surprising and unexpected, and apparently reflects some inter-reaction in the formation of the complex as an anhydrous solution, since combining the iodine and ethylene oxide condensate in dilute solution does not yield the solubilizing effect on the condensate, nor does adjusting the pH of a suspension of the alkyl phenol ethylene oxide condensate in water to the pH (about 3 in the case of a nonyl phenol ethylene oxide condensate) which is obtained when the complex is dissolved in water, have any solubilizing effect on the condensate.

It has been found, for example, that a nonyl phenol ethylene oxide condensate containing approximately 6 mols of ethylene oxide per mol of nonyl phenol has an apparent peak activity or capacity for binding elemental iodine in complex form when compared with other soluble and insoluble ethylene oxide condensates. The following tabulation demonstrates this peak activity as measured in terms of percent retention of iodine when complexes of the respective nonyl phenol ethylene oxide condensates with iodine are allowed to stand over night in open beakers at room temperature.

NONYL PHENOL ETHYLENE OXIDE CONDENSATE

| Solubility | No. of ETO | Percent ETO | Percent Iodine Retention |
|---|---|---|---|
| Insoluble | 4 | 44 | 31 |
| Do | 6 | 54 | 46 |
| Soluble | 9.5 | 65 | 39 |

It is possible to prepare practical carrier-iodine formulations both as concentrates and use dilutions, using as the only iodine carrier an alkyl phenol ethylene oxide condensate of the type described such as a condensate containing approximately 6 mols of ethylene oxide per mol of nonyl phonol, by first forming a complex of about one part of iodine in about 3 to 6, and preferably about 5, parts by weight of the carrier, mixing one part of the complex with about 0.25 to 2 parts, and preferably about 0.5 part, of hydroxyacetic acid (based on 70% hydroxyacetic acid) and diluting the mixture with water to provide an iodine concentration of about 2.0% w./v. Whereas the complex alone dissolved in water to similar concentration forms a stable gel, the presence of the hydroxyacetic acid gives a fluid aqueous concentrate which is quite stable on standing even at elevated temperatures. With the higher concentrations of hydroxyacetic acid some separation may result on standing at 50° C. but homogeneity is readily established by shaking or stirring the concentrate. Any of these concentrates whether containing 0.25 part of hydroxyacetic acid or 2 parts of hydroxyacetic acid, can be combined with water to form use dilutions containing from 1 p.p.m. to 100 p.p.m. of iodine which are clear and stable and which have advantageous low foaming and clear draining properties.

In the formulations above described the preferred proportion of hydroxyacetic acid, i.e. 0.5 part of 70% acid per part of iodine complex, provides in use dilution of a pH of about 2.5 and variation in the proportion of hydroxyaceic acid will depend primarily upon the particular pH desired in use dilutions having regard to special conditions for which the product is intended.

Whereas phosphoric acid has previously been found to have special advantage in pH control with germicidal preparations wherein iodine is complexed with a water-soluble carrier, the hydroxyacetic acid is distinctly superior in the presence of the normally water-insoluble alkyl phenol-ethylene oxide carrier. The problem with phosphoric acid in this instance is that in concentrate form there is a separation or stratification which is not readily reconstituted and which prevents further dilution of the concentrate to form use solutions.

In addition to having practical application in preparations as above described containing no other iodine carrier, the normally insoluble alkyl phenol ethylene oxide condensates have special advantage when employed in conjunction with certain of the Pluronics in poly-carrier systems. The Pluronics as distributed by Wyandotte Chemicals Corporation are products covered by United States Patent No. 2,674,619 dated April 6, 1954 and defined therein as compounds according to the formula $$HO-(C_2H_4O)_x(C_3H_6O)_y(C_2H_4O)_{x'}-H$$

where y equals at least 15; and $(C_2H_4O)_{x+x'}=20-90\%$ of the total weight of the compound.

Not all of the Pluronics are suitable for use in accordance with the present invention and for the purpose of the present invention it is to be understood that compounds suitable for use are those, having reference to the foregoing formula, wherein the group $(C_3H_6O)_y$ has a molecular weight within the range of 1500 to 3000 and $(C_2H_4O)_{x+x'}=30$ to $60\%$ of the total weight of the compound.

In the following discussion abbreviated reference will be made to certain Pluronics in accordance with the following tabulation:

|  | $(C_3H_6O)_y$ | $(C_2H_4O)_{x+x'}$ |
|---|---|---|
|  |  | Percent |
| Pluronic L62* | 1,500–1,800 | 20–30 |
| Pluronic P65 | 1,500–1,800 | 50–60 |
| Pluronic P84 | 2,100–2,500 | 40–50 |
| Pluronic P85 | 2,100–2,500 | 50–60 |

* Note that Pluronic L62, although listed in the foregoing tabulation and included for comparative purposes in certain of the following examples, represents a substance outside the preferred range above mentioned of compounds containing 30 to 60% ethylene oxide.

Also to facilitate ease of reference throughout the remainder of the specification the nonyl phenol ethylene oxide condensates containing about 6 mols of ethylene oxide per mol of nonyl phenol, will be sometimes referred to as "NP-6."

Formulations in which both NP-6 and a selected Pluronic are present as iodine carriers can be prepared either by first forming separate complexes of iodine with NP-6 and iodine with the Pluronic, but for the sake of simplicity in formulation the iodine and the two carriers are generally added together and mixed, with heating, if necessary, to dissolve the iodine in the combined carriers, thereby effecting concurrent complexing of part of the iodine with each of the carriers. It is to be understood, however, that the same advantages hereinafter discussed are realized in the use of NP-6 plus the Pluronic as iodine carriers regardless of whether the complexing of iodine with the carriers is effected separately or concurrently as above described.

The presence of NP-6 with Pluronic as an iodine carrier in the improved formulations provides a number of practical advantages including in particular an enhanced degree of complexing of the iodine, increased iodine color (in use dilutions) thereby enhancing the effectiveness of the color indication of germicidal activity when use solutions are being consumed, enhanced draining properties on articles and surfaces treated with use solutions, and the capacity to complex unusually high percentages of available iodine.

Considering first the advantage of high iodine concentration in a complex, a typical complex is prepared by mixing together for two hours at 50–55° C.

G.
Pluronic P65 _____ 43.4
NP-6 _____ 11.6
Elemental iodine _____ 45

The fluid complex obtained contains 36.3% available iodine by thiosulfate titration and is suitable per se as a commercial concentrate. The main purpose of an iodine concentrate is to spare the formulator the need of handling heated solutions and dissolving corrosive elemental iodine therein which necessitates special equipment. The higher the iodine concentration supplied, the greater the ease of formulating a particular product for a particular end use. When using the high iodine concentrate described above, it is expected that additional detergent (such as the above preferred Pluronic-NP-6 detergents) be added with acid, if desired, and a convenient amount of water.

In the foregoing example similar useful complexes are prepared by substituting an approximately equivalent amount of Pluronic P84 or Pluronic P85 for the Pluronic P65. It will, of course, be recognized that these formulations are illustrative of approximately the maximum amount of iodine that can be complexed with an NP-6 Pluronic carrier mixture and that in preparing concentrates for particular purposes it may be desirable not only to vary somewhat the proportions of NP-6 to Pluronic, but also to use somewhat less than the maximum amount of iodine.

Having reference to the foregoing example, however, attention is directed to the following examples presented for comparative purposes to indicate how relatively small deviations from this formulation result in unsatisfactory products.

A complex is prepared by mixing together for two hours at 50–55° C.

G.
Nonyl phenol ethylene oxide condensate containing
   15 mols of ethylene oxide _____ 43.4
NP-6 _____ 11.6
Iodine _____ 45

This complex shows 32.9% iodine by thiosulfate titration, but all of the iodine is not dissolved in the carriers. Furthermore, the product does not disperse in water and precipitates iodine from aqueous suspension in a manner unacceptable for use as a concentrate. Even when the amount of iodine is reduced to provide approximately 29% iodine in the complex, the product exhibits the disadvantages mentioned and a physically satisfactory product can only be obtained with this combination of carriers when the iodine is reduced to about 20–25% concentration.

Three additional complexes were prepared by heating together for two hours at 50–55° C. the components as noted below, and the available iodine was determined by thiosulfate titration:

| Complex | Available Iodine, Percent |
|---|---|
| (a) { 55 g. Pluronic L62<br>45 g. Elemental iodine | 30.9 |
| (b) { 43.4 g. Pluronic L62<br>11.6 g. NP-6<br>45 g. Elemental iodine | 36.6 |
| (c) { 43.4 g. Pluronic P65<br>11.6 g. Nonyl phenol ethylene oxide condensate containing about 30 mols of ethylene oxide.<br>45 g. Elemental iodine | 36.8 |

Each of these complexes was unsatisfactory for one or more reasons. All three of the complexes formed gels when mixed with water in 1:1 and 1:2 dilutions, a serious problem in practical formulating of commercial products. As compared with complex (b), the iodine loss in complex (a) becomes excessive. Complex (c) upon dilution with three or more parts of water is physically unstable with precipitation of solids. Complex (b) differs from the previously described complex using the preferred Pluronics only in the substitution of Pluronic L62 and is actually a borderline composition insofar as the present invention is concerned, since once diluted with three or more parts of water, it can be effectively utilized in preparing use solutions. As previously mentioned, however, the initial gel formation when combining with 1 to 2 parts of water makes this complex relatively undesirable as a commercial product.

In preparing carrier-iodine formulations containing NP-6 in conjunction with the selected Pluronics, the proportion of Pluronic to NP-6 should be within the range of about 2.5 to 1–5 to 1 by weight with the preferred ratio being about 3.75 to 1. If a substantially greater proportion of the NP-6 is present, the products will be unsatisfactory due to incomplete solubility in use dilution. On the other hand, if insufficient of the NP-6 is employed, the product will not possess the advantages with respect to color, drainage, and reduction of losses due to vapor pressure.

As illustrative of the variation in proportions of the Pluronic and NP-6, the following formulations were prepared by heating together the iodine and carrier, or carriers, to dissolve the iodine therein and then diluting with water and isopropanol in the amounts indicated:

Table 1

|             | 1      | 2      | 3      | 4      | 5      | 6      |
|-------------|--------|--------|--------|--------|--------|--------|
| Pluronic P-65 | 15    | 11.84  | 11.0   | 10.0   | 9.0    | 7.0    |
| NP-6        | 0      | 3.16   | 4.0    | 5.0    | 6.0    | 8.0    |
| Iodine      | 2.75   | 2.75   | 2.75   | 2.75   | 2.75   | 2.75   |
| Isopropanol | 2.45   | 2.45   | 2.45   | 2.45   | 2.45   | 2.45   |
| Water       | 79.80  | 79.80  | 79.80  | 79.80  | 79.80  | 79.80  |
|             | 100.00 | 100.00 | 100.00 | 100.00 | 100.00 | 100.00 |

Formulation 5 is unsatisfactory because of incomplete solubility at use dilutions. Formulations 1 to 5 were diluted with water to iodine concentration of 100 p.p.m., and 30 ml. quantities of these dilutions in 200 ml. beakers were exposed for evaporation at 25° C. for 4 hours and then titrated for residual iodine. The results of this comparison expressed in percent retention of iodine in solution are as follows:

Table 2

|   | Iodine Initially | Percent Retention in solution |
|---|------------------|-------------------------------|
| 1 | 100 p.p.m.       | 8                             |
| 2 | 100 p.p.m.       | 23                            |
| 3 | 100 p.p.m.       | 21                            |
| 4 | 100 p.p.m.       | 24                            |
| 5 | 100 p.p.m.       | 24                            |
| 6 | not stable       |                               |

Improved formulations containing as iodine carriers mixtures of selected Pluronics and NP-6 are preferably acidified with phosphoric acid or hydroxyacetic acid for controlling the pH in the use dilution. For this purpose the hydroxyacetic acid is considered preferable, although phosphoric acid can, in many instances, be used as well as hydroxyacetic acid. (Thus differing from the situation previously described which prevails when NP-6 is the only iodine carrier.) When using phosphoric acid, however, it has been found that not all formulations in which the Pluronic to NP-6 ratio is within the range of 2.5 to 1–5 to 1 will be satisfactory when high phosphoric acid contents are desired. Thus, it appears that an insufficient proportion of total carrier to phosphoric acid, or too low a ratio of Pluronic to NP-6 can impair stability of high phosphoric acid formulations and in such instances, the amount of phosphoric acid should be reduced, or acidification should be effected using hydroxyacetic acid.

Particularly in acidified solution, the coloring enhancing effect of use dilutions because of the presence of the NP-6 carrier becomes apparent. An illustration of this is found in the following example wherein a plurality of formulations were prepared by complexing iodine with a mixture of Pluronic P65 and NP-6 and then diluting the same with water and phosphoric acid in the amounts indicated:

Table 3

|                        | 1    | 2    | 3    | 4    |
|------------------------|------|------|------|------|
| Pluronic P65           | 19   | 15   | 14   | 13   |
| NP-6                   | 0    | 4    | 5    | 6    |
| Iodine                 | 2.9  | 2.9  | 2.9  | 2.9  |
| $H_3PO_4$(75%)         | 21   | 21   | 21   | 21   |
| $H_2O$                 | 57.1 | 57.1 | 57.1 | 57.1 |

Quantities of these formulations were diluted to 100 p.p.m. iodine concentration and 50 ml. proportions of the dilute solutions in 250 ml. beakers were exposed for 6 hours at 25° C. to allow vaporization of iodine therefrom. At the end of this period, solutions were titrated for available iodine and results are tabulated below in percent retention of iodine. Also in the following tabulation are relative Gardner type color values based on 25 p.p.m. iodine dilution of the respective formulations. The color values are based on a 2× expansion of the Gardner color scale between 0 and 3:

Table 4

| Formulation | Iodine Initially, p.p.m. | Percent Iodine Retention | Color at 25 p.p.m. |
|-------------|--------------------------|--------------------------|--------------------|
| 1           | 100                      | 11                       | 1                  |
| 2           | 100                      | 27                       | 4                  |
| 3           | 100                      | 27                       | 4                  |
| 4           | 100                      | 29                       | 5                  |

Another group of formulations were prepared, this time using Pluronic P84 together with NP-6, and after initially reacting iodine with the carriers the resulting complexes were dissolved in water containing phosphoric acid or hydroxyacetic acid and in one instance isopropanol in the amounts indicated in the following tabulation:

|                       | 1    | 2    | 3    | 4    | 5    | 6    | 7    |
|-----------------------|------|------|------|------|------|------|------|
| Pluronic P84          | 16.0 | 13.0 | 14.0 | 12.0 | 12.0 | 12.0 | 12.0 |
| NP-6                  | 0    | 4.0  | 3.0  | 5.0  | 4.0  | 4.0  | 4.0  |
| Iodine                | 2.9  | 2.7  | 2.7  | 2.7  | 2.7  | 2.7  | 2.7  |
| Phos. Acid 100%       | 15   | 15   | 15   | 15   | 10   | 15   | 0    |
| Hydroxyacetic acid 100% | 0  | 0    | 0    | 0    | 5    | 0    | 15   |
| Isopropanol 100%      | 0    | 0    | 0    | 0    | 0    | 5    | 0    |
| Water to 100%         |      |      |      |      |      |      |      |

All of the above formulations remain homogeneous at room temperature and at 125° F. Formulation 1, however, is included merely for comparison purposes and is subject to the limitations previously mentioned with respect to Pluronic formulations containing no NP-6. Portions of the foregoing formulations were diluted with water to a 100 p.p.m. iodine concentration and 200 ml. portions thereof in 250 ml. beakers were exposed at 25° C. for 18 hours to allow vaporization of iodine. The residual solutions were then titrated with thiosulfate to determine residual iodine and results expressed in terms of percent iodine retention are tabulated below. (The sequence of the formulations is altered for orderly listing in respect to amounts of NP-6.)

| Formulation | Total Det., percent | Amt. NP-6 | Relative percent Iodine Retention |
|-------------|---------------------|-----------|-----------------------------------|
| 1           | 16                  | 0         | 14                                |
| 2           | 17                  | 3         | 28                                |
| 3           | 17                  | 4         | 34                                |
| 4           | 16                  | 4         | 31                                |
| 5           | 16                  | 4         | 34                                |
| 6           | 16                  | 4         | 32                                |
| 7           | 17                  | 5         | 36                                |

It should be noted that particularly with the Pluronics P84 and P85 there is a pronounced tendency when using these carriers alone to form gels when diluting the carrier-iodine complex in water. The presence of NP-6 with the Pluronic or Pluronics P84 and P85 offsets this disadvantage and facilitates preparation of aqueous dilutions. By way of illustration, 20 grams of a complex made by heating together 65 parts of Pluronic P84, 15 parts NP-6 and 20 parts of iodine (containing 11.4% of iodine by titration) can be diluted to 100 mls. to produce a 2% iodine concentrate without passing through a gel stage.

Various changes and modifications in the novel iodine formulations herein described will occur to those skilled in the art, and to the extent that these changes and modifications are embraced by the appended claims, it is to be understood that they constitute part of our invention.

We claim:
1. A germicidal composition comprising a complex of iodine with a water insoluble alkyl phenol-ethylene oxide condensate, wherein alkyl substituents in the phenol group contain a total of 8 to 20 carbon atoms, and wherein the amount of ethylene oxide is such that the ratio of carbon atoms in the alkyl phenol to mols of ethylene oxide is in the range of about 2.1 to 1–3 to 1, and the proportion of ethylene oxide condensate to iodine is within the range of about 3 to 1–6 to 1 and imparts water solubility to said complex.

2. A germicidal composition as defined in claim 1, wherein said composition contains hydroxyacetic acid in the proportion of about 0.25 to 2 parts of hydroxyacetic acid to each part by weight of complex.

3. A germicidal composition as defined in claim 1, wherein said composition contains a second complex of iodine with a polypropylene glycol-ethylene oxide condensate of the formula $$HO-(C_2H_4O)_x(C_3H_6O)_y(C_2H_4O)_{x'}-H$$

in which the molecular weight of the group $(C_3H_6O)_y$ is within the range of 1500 to 3000 and $(C_2H_4O)_{x+x'}$ equals 30 to 60% of the total weight of the compound, and wherein the proportion of polypropylene glycol-ethylene oxide condensate to alkyl phenol-ethylene oxide condensate is within the range of about 2.5 to 1–5 to 1.

4. A germicidal composition as defined in claim 3, wherein the composition is acidified by means of hydroxyacetic acid, phosphoric acid, or mixtures thereof.

5. A germicidal composition comprising a complex of iodine with a water insoluble nonyl phenol-ethylene oxide condensate containing approximately 6 mols of ethylene oxide per mol of nonyl phenol, wherein the proportion of ethylene oxide condensate to iodine is within the range of about 3 to 1–6 to 1 and imparts water solubility to said complex.

6. A germicidal composition as defined in claim 5, wherein said composition contains hydroxyacetic acid in the proportion of about 0.25 to 2 parts of hydroxyacetic acid to each part by weight of complex.

7. A germicidal composition as defined in claim 5, wherein said composition contains a second complex of iodine with a polypropylene glycol-ethylene oxide condensate of the formula $$HO-(C_2H_4O)_x(C_3H_6O)_y(C_2H_4O)_{x'}-H$$

in which the molecular weight of the group $(C_3H_6O)_y$ is within the range of 1500 to 3000 and $(C_2H_4O)_{x+x'}$ equals 30 to 60% of the total weight of the compound, and wherein the proportion of polypropylene glycol-ethylene oxide condensate to nonyl phenol-ethylene oxide condensate is within the range of about 2.5 to 1–5 to 1.

8. A germicidal composition as defined in claim 7, wherein the composition is acidified by means of hydroxyacetic acid, phosphoric acid, or mixtures thereof.

9. A germicidal composition comprising a complex of iodine with a mixed carrier consisting essentially of 1 part by weight of any alkyl phenol-ethylene oxide condensate, wherein alkyl substituents on the phenol group contain a total of 8 to 20 carbon atoms, and wherein the amount of ethylene oxide is such that the ratio of carbon atoms in the alkyl phenol to mols of ethylene oxide is in the range of about 2.1 to 1–3 to 1, and 2.5 to 5 parts by weight of a polypropylene glycol-ethylene oxide condensate of the formula $$HO-(C_2H_4O)_x(C_3H_6O)_y(C_2H_4O)_{x'}-H$$

in which the molecular weight of the group $(C_3H_6O)_y$ is within the range of 1500 to 3000 and $(C_2H_4O)_{x+x'}$ equals 30 to 60% of the total weight of the compound, and said composition containing in excess of 30% by weight of iodine complexed with said carriers.

References Cited in the file of this patent
UNITED STATES PATENTS

| | | |
|---|---|---|
| 2,674,619 | Wyandotte | Apr. 6, 1954 |
| 2,759,869 | Sutton | Aug. 21, 1956 |
| 2,840,510 | Katz | June 24, 1958 |
| 2,931,777 | Shelauski | Apr. 5, 1960 |

OTHER REFERENCES

Gershenfeld: Soap and Chemical Specialties, April 1955, vol. 31, No. 4, pp. 139–141, 195.